(12) United States Patent
Smith et al.

(10) Patent No.: US 10,015,087 B1
(45) Date of Patent: Jul. 3, 2018

(54) MODEM HARDWARE ABSTRACTION LAYER (MHAL) ON-CHIP BUS PACKET ROUTER

(71) Applicant: Rockwell Collins, Inc., Cedar Rapids, IA (US)

(72) Inventors: Fay A. Smith, Cedar Rapids, IA (US); Peter B. Laird, Cedar Rapids, IA (US); Jeremiah C. Leary, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 125 days.

(21) Appl. No.: 14/973,046

(22) Filed: Dec. 17, 2015

(51) Int. Cl.
*H04L 12/741* (2013.01)
*H04L 12/54* (2013.01)
*H04L 12/947* (2013.01)

(52) U.S. Cl.
CPC ............. *H04L 45/74* (2013.01); *H04L 12/56* (2013.01); *H04L 49/25* (2013.01)

(58) Field of Classification Search
CPC ...... H04L 45/74; H04L 12/5689; H04L 49/25
See application file for complete search history.

(56) References Cited

U.S. PATENT DOCUMENTS

| | | | | |
|---|---|---|---|---|
| 6,993,022 B1* | 1/2006 | James | ............... | H04L 29/12009 370/389 |
| 2008/0225888 A1* | 9/2008 | Valluri | .................... | H04L 67/02 370/466 |
| 2009/0046706 A1* | 2/2009 | Chernow | ............ | H04L 12/5692 370/352 |
| 2009/0248794 A1* | 10/2009 | Helms | ................. | H04L 12/2861 709/203 |
| 2012/0084473 A1* | 4/2012 | Xia | ........................ | H04L 12/403 710/105 |
| 2012/0290823 A1* | 11/2012 | Cuiffo | .................. | H04B 1/0003 713/1 |
| 2013/0163608 A1* | 6/2013 | Nagatsuka | .............. | G06F 13/36 370/419 |

OTHER PUBLICATIONS

Joint Tactical Radio System Standard MHAL on Chip Bus Application Program Interface, Department of Defense Joint Tactical Networking Center, United States Navy, Version: 1.1.5, Jun. 26, 2013, 145 pages, Found online at: http://www.public.navy.mil/jtnc/sca/Documents/SCA_APIs/API_1.1.5_20130626_Mocb.pdf>.

* cited by examiner

*Primary Examiner* — Christine Ng
(74) *Attorney, Agent, or Firm* — Angel N. Gerdzhikov; Donna P. Suchy; Daniel M. Barbieri

(57) ABSTRACT

A system and related method for routing Modem Hardware Abstraction Layer (MHAL) On-Chip Bus (MOCB) protocol data communications between a first system on a chip (SoC) device and at least one second SoC device abstracts the physical layer across one or more physical devices via one or more packet routers, the packet routers capable of receiving MOCB commands and responses and generating data packets based on the commands and responses, the data packets having a first word indicating the destination device. Other packet routers determine the destination of inbound data packets, and whether to bypass or receive the data packets, based on the first word (without having to fully decode the data packets) and deserialize received packets into MOCB commands and responses, forwarding the commands or responses to the intended destination SoC device.

18 Claims, 7 Drawing Sheets

MODEM HARDWARE ABSTRACTION LAYER (MHAL) ON-CHIP BUS PACKET ROUTER

GOVERNMENT LICENSE RIGHTS

This invention was made with government support under Government Contract No. N00014-12-C-0299, ADVANCED TACTICAL DATA LINK, awarded by the Office of Naval Research. The government has certain rights in the invention.

BACKGROUND

On-chip busses (OCB) are now commonly found in field programmable gate arrays (FPGA) and other system-on-a-chip (SoC) devices. An address-based OCB allows software or an FPGA master to read or write anywhere to an FPGA slave. However, current OCB architecture does not work in system environments including more than one FPGA on a chip, or across multiple chips. One solution involves an individual control bus for each FPGA in the system, where each FPGA is marked as a different logical destination. However, such a "chip to chip" architecture is not easily modified, as software must be changed with each modification to ensure that data reaches the intended physical device. In addition, only a single off-chip destination is allowed, and the "chip to chip" solution does not provide for burst support, bidirectionality, or full duplex communications.

SUMMARY

In one aspect, embodiments of the inventive concepts disclosed herein are directed to a system for routing data communications between a first system-on-a-chip (SoC) device and one or more second SoC devices including a third SoC device. The system may include one or more packet routers communicatively coupled to the first SoC device. For example, a packet router may be associated with the third SoC device. The packet router may receive from the third SoC device a first data packet having a destination. The packet router may determine whether the first data packet is an inbound data packet having a destination associated with the first SoC device or a bypass data packet having a destination associated with a second SoC device other than the third SoC device. The packet router may receive from the first SoC device an MOCB command or an MOCB response. The packet router may generate an outbound data packet based on the received MOCB command or MOCB response, the outbound data packet having a destination associated with the third SoC device. The packet router may generate an MOCB command or an MOCB response based on the received inbound data packet. The packet router may forward the outbound data packet to the third SoC device, and the bypass data packet to its destination second SoC device. The packet router may forward the generated MOCB command or generated MOCB response to the first SoC device.

In a further aspect, the inventive concepts disclosed herein are directed to a system wherein the packet router includes a router bridge coupling the packet router to the first SoC device. The router bridge may include a packet type director coupled to a quick router of the packet router. The packet type director may receive the inbound data packet from the third SoC device and determine whether the inbound data packet is a command data packet or a response data packet. The packet type director may forward the response data packet to a target interface of the router bridge and forward the command data packet to an initiator interface of the router bridge.

The target interface may generate an MOCB return response or an MOCB invalid address response based on the response data packet, forwarding the generated response to the first SoC device. The target interface may receive the MOCB command from the first SoC device, generate the outbound data packet based on the received MOCB command, and forward the outbound data packet to a source selector of the router bridge.

The initiator interface of the router bridge may receive the received MOCB response from the first SoC device. The received MOCB response may be a return response or an invalid address response. The initiator interface may generate the outbound data packet based on the received MOCB response and forward the outbound data packet to the source selector. The initiator interface may generate an MOCB command based on a received command data packet, and forward the generated MOCB command to the first SoC device.

The source selector of the router bridge may forward the received outbound data packet to an arbiter of the packet router. The arbiter may couple the packet router to the third SoC device, and may receive the outbound data packet from the router bridge. The arbiter may receive another bypass data packet from another second SoC device other than the third SoC device. The arbiter may forward the outbound data packet and the bypass data packet to their respective destination SoC devices.

The quick router of the packet router may be coupled to the third SoC device. The quick router may receive the first data packet from the third SoC device, and determine whether the first data packet is an inbound data packet (having a destination associated with the first SoC device) or a bypass data packet (having a destination associated with a second SoC device other than the third SoC device) based on the destination of the first data packet. The quick router may forward the inbound data packet to the router bridge of the packet router, and forward the bypass data packet to its destination SoC device.

In a further aspect, the inventive concepts disclosed herein are directed to a system wherein the first data packet includes an ordered sequence of words (e.g., data words, data fields). The quick router may determine whether the received first data packet is an inbound data packet or a bypass data packet based on the first word of the first data packet, the first word corresponding to the destination of the first data packet.

In a further aspect, the inventive concepts disclosed herein are directed to a system wherein the received MOCB return response or the received MOCB invalid address response are received from a Modem Hardware Abstraction Layer (MHAL) On-Chip Bus (MOCB) protocol target device (e.g., slave). The received MOCB command may include a read command intended for the MOCB protocol target device or a write command intended for the MOCB protocol target device. The generated MOCB return response and the generated MOCB invalid address response are intended for an MOCB protocol initiator device (e.g., master). The generated MOCB command may include a read command received from the MOCB protocol initiator device or a write command received from the MOCB protocol initiator device.

In a further aspect, the inventive concepts disclosed herein are directed to a system wherein the arbiter includes a first in/first out (FIFO) interface configured to receive the outbound data packet from the router bridge, and a FIFO interface configured to receive the bypass data packet from the second SoC device other than the third SoC device. The arbiter may be configured to forward the outbound data packet and the bypass data packet to their respective destination SoC devices based on an arbitration scheme (e.g., round-robin) or an assigned priority.

In a further aspect, the inventive concepts disclosed herein are directed to a system wherein the first SoC device and the second SoC devices are arranged in a star topology, a tree topology, a line topology, a mesh topology, or a ring topology.

In a further aspect, the inventive concepts disclosed herein are directed to a system wherein the first SoC device and the second SoC devices include at least one field programmable gate array (FPGA).

In a further aspect, the inventive concepts disclosed herein are directed to a system wherein the first SoC device and the second SoC devices are embodied in a single physical device.

In a further aspect, the inventive concepts disclosed herein are directed to a system wherein the first SoC device and the second SoC devices are embodied in two or more physical devices.

In a further aspect, the inventive concepts disclosed herein are directed to a system for routing data communications between a first SoC device and one or more second SoC devices including a third SoC device. The system may include circuitry for receiving from the third SoC device a first data packet having a destination. The system may include circuitry for determining whether the first data packet is an inbound data packet having a destination associated with the first SoC device or a bypass data packet having a destination associated with a second SoC device other than the third SoC device. The system may include circuitry for receiving from the first SoC device an MOCB command or an MOCB response. The system may include circuitry for generating an outbound data packet based on the received MOCB command or MOCB response, the outbound data packet having a destination associated with the third SoC device. The system may include circuitry for generating an MOCB command or an MOCB response based on the received inbound data packet. The system may include circuitry for forwarding at least one of the outbound data packet and the bypass data packet to their respective destination SoC devices. The system may include circuitry for forwarding the generated MOCB command or MOCB response to the first SoC device.

In a still further aspect, the inventive concepts disclosed herein are directed to a system further including circuitry for determining, based on a first word of the first data packet, whether the first data packet is an inbound data packet or a bypass data packet. The first word of the first data packet may correspond to the destination of the first data packet.

In a further aspect, the inventive concepts disclosed herein are directed to a system further including: circuitry for determining if the inbound data packet is a command data packet or a response data packet; circuitry for generating an MOCB return response or an MOCB invalid address response based on the received response data packet; circuitry for generating the MOCB command based on the command data packet; and circuitry for forwarding the generated MOCB return response or the generated MOCB invalid address response to the first SoC device.

In a further aspect, the inventive concepts disclosed herein are directed to a system further including circuitry for forwarding at least one of the outbound data packet and the bypass data packet to their respective destination SoC devices based on at least one of an arbitration scheme and an assigned priority.

In a further aspect, the inventive concepts disclosed herein are directed to a system wherein the first SoC device and the second SoC devices are arranged in a star topology, a tree topology, a line topology, a mesh topology, or a ring topology.

In a further aspect, the inventive concepts disclosed herein are directed to a system wherein the first SoC device and the second SoC devices are embodied in a single physical device.

In a further aspect, the inventive concepts disclosed herein are directed to a system wherein the first SoC device and the second SoC devices are embodied in two or more physical devices.

In a still further aspect, the inventive concepts disclosed herein are directed to a method for routing data communications between a first SoC device and at least one second SoC device including a third SoC device. The method may include receiving from the third SoC device a first data packet having a destination. The method may include determining whether the first data packet is an inbound data packet having a destination associated with the first SoC device or a bypass data packet having a destination associated with a second SoC device other than the third SoC device. The method may include receiving from the first SoC device an MOCB command or an MOCB response. The method may include generating an outbound data packet based on the received MOCB command or MOCB response, the outbound data packet having a destination associated with the third SoC device. The method may include generating an MOCB command or MOCB response based on the received inbound data packet. The method may include forwarding at least one of the outbound data packet (to the third SoC device) and the bypass data packet (to the second SoC device other than the third SoC device). The method may include forwarding the generated MOCB command or MOCB response to the first SoC device.

In a still further aspect, the inventive concepts disclosed herein are directed to a method further including determining, based on a first word of the first data packet, whether the first data packet is an inbound data packet or a bypass data packet. The first word of the first data packet may correspond to the destination of the first data packet.

In a further aspect, the inventive concepts disclosed herein are directed to a method further including determining if the received inbound data packet is a command data packet or a response data packet. The method may include generating an MOCB return response or an MOCB invalid address response based on the received response data packet. The method may include generating the MOCB command based on the received command data packet. The method may include forwarding the generated MOCB return response and the generated MOCB invalid address response to the first SoC device.

In a further aspect, the inventive concepts disclosed herein are directed to a method further including forwarding at least one of the outbound data packet and the bypass data packet to their respective destination SoC devices based on at least one of an arbitration scheme and an assigned priority.

BRIEF DESCRIPTION OF THE DRAWINGS

The inventive concepts disclosed herein may be better understood by those skilled in the art by reference to the accompanying figures in which.

DETAILED DESCRIPTION

Figure 1:
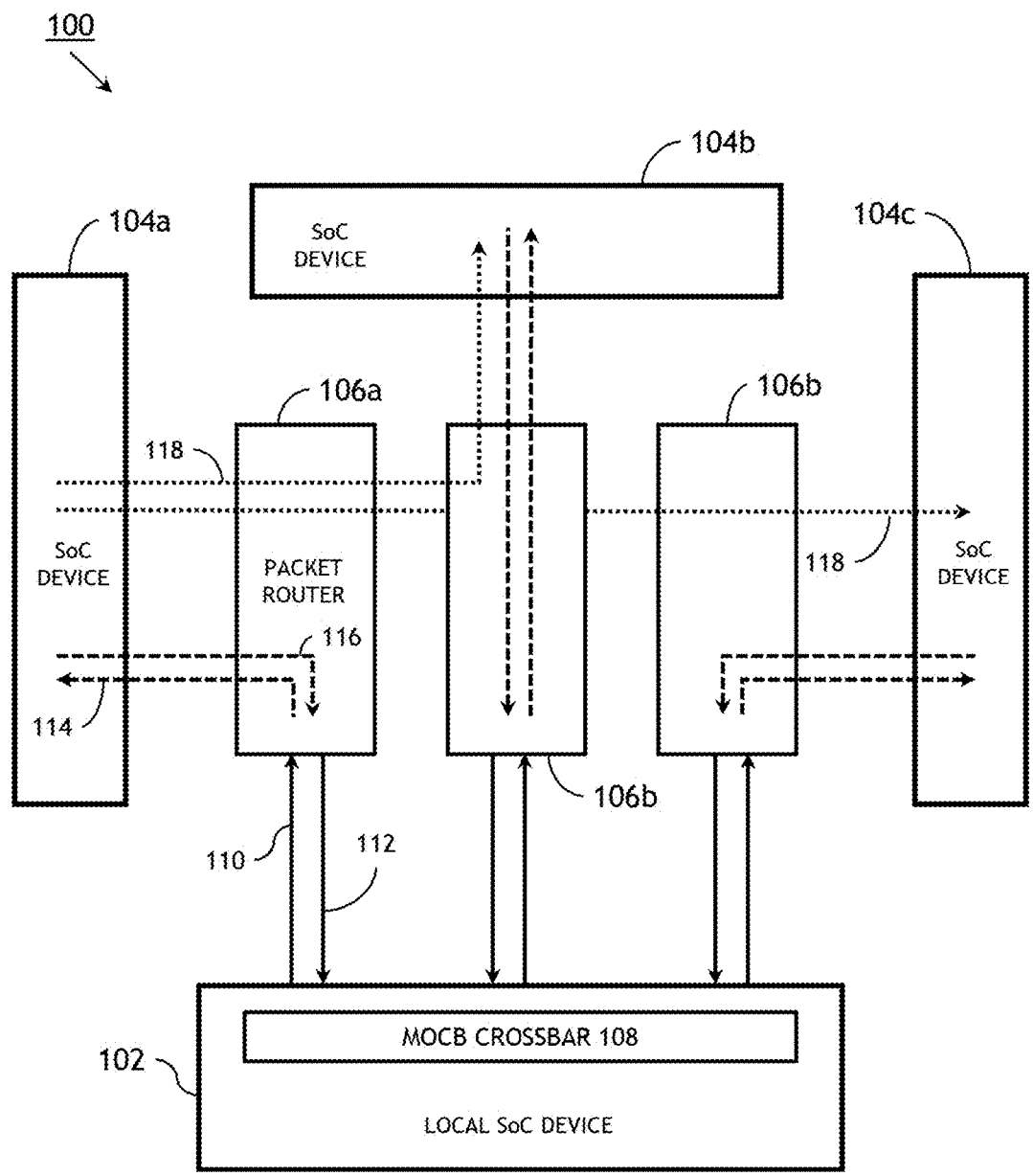
FIG. 1 is a block diagram of an embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for routing data communications between a first system on a chip (SoC) device and one or more second SoC devices. The system may employ one or more packet routers capable of obfuscating the physical nature of an On-Chip Bus (OCB) architecture and providing a single, continuous address region between all physical devices. The packet routers provide full-duplex communications between all connected devices and support bursting and flow-control signaling inherent in Avalon, AXI, Modem Hardware Abstraction Layer OCB (MOCB), and other OCB standards.

The packet router functionality translates address and data lines from an OCB into data packets communicable between multiple OCB islands while maintaining OCB protocols. This functionality requires dedicated input and output interfaces to and from a local OCB device for each off-chip interface. Routing tables may be defined throughout the entire system. Arbitration may occur at any interface where a message collision is possible.

A benefit of this functionality is that any OCB master (e.g., initiator) need only know a particular destination address rather than a corresponding physical device. Where previously an on-chip endpoint was necessary for communicating with off-chip destinations, and a protocol layer that must be removed before data is sent to the off-chip destination, the packet routers may properly route messages so that every destination appears local. Packet router functionality also provides for bypass routes between different off-chip interfaces, allowing for a variety of network topologies (star, tree, bus, line). If a message received from off-chip is non-local, i.e., intended for a different off-chip destination or physical device, the message may be routed directly to the appropriate port or interface.

Referring to FIG. 1, an embodiment of a three-port implementation of a system 100 for routing data communications includes a local system on a chip (SoC) device 102 and three nonlocal SoC devices 104a-c. The system 100 may include any combination or number of local SoC devices 102 and nonlocal SoC devices 104a-c; each of the local SoC devices 102 and the nonlocal SoC devices 104a-c may be designated an initiator (e.g., master) device or a target (e.g., slave) device. The SoC device 102 and the SoC devices 104a-c may include one or more field programmable gate arrays (FPGA) or application specific integrated circuits (ASIC) on a single chip or physical device, or multiple FPGAs and/or ASICs situated across a group of modems or other physical devices. The system 100 may include a group of packet routers 106a-c coupled to a Modem Hardware Abstraction Layer (MHAL) On-Chip Bus (MOCB) crossbar 108 of the local on-chip bus (OCB) of the local SoC device 102. Each packet router 106a, 106b, 106c may be respectively associated with a nonlocal SoC device (e.g., off-chip destination) 104a, 104b, 104c and connect the local SoC device 102 thereto.

Generally speaking, a packet router 106a may independently handle memory-mapped on-chip bus protocol (e.g., MOCB) read or write commands 110 issued by the local SoC device 102 to a nonlocal SoC device 104a serving as a target device, as well as MOCB responses 112 (including return responses and invalid-address responses) from the nonlocal SoC device 104a to the local SoC device 102, through a single interface. For example, the packet router 106a may translate the read or write commands 110 into data packets 114 for efficient off-chip transmission to the nonlocal SoC device 104a. Similarly, the packet router 106a may translate received data packets 116 from the nonlocal SoC device 104a into MOCB responses 112 for transmission to the MOCB crossbar 108. In addition, the packet router 106a may receive bypass data packets 118 from the SoC device 104a, the bypass data packets having destinations associated with off-chip destinations other than the local SoC device 102 (SoC devices 104b, 104c) and forward the bypass data packets 118 to their destination SoC devices 104b, 104c via the respective packet routers 106b, 106c connected to the SoC devices 104b, 104c.

Figure 2A:
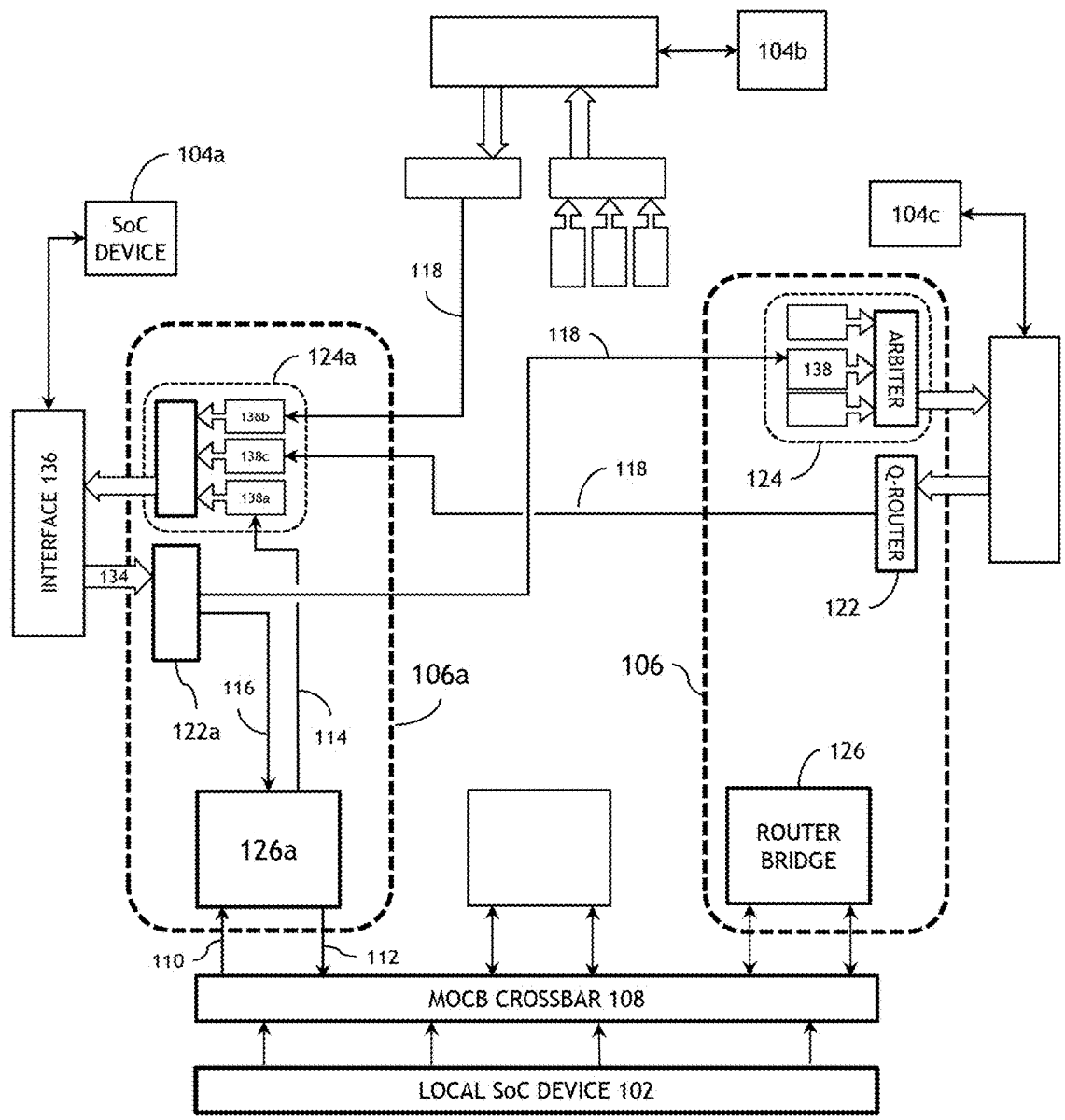
FIG. 2A is a detailed block diagram of the system of FIG. 1.

Referring to FIG. 2A, a detailed diagrammatic view of the three-port implementation of the system 100 illustrated by FIG. 1 is shown. In one embodiment, each packet router 106 may comprise three major components: a quick router 122, an arbiter 124, and a router bridge 126. The quick router 122 of each packet router 106 may link to a systemwide routing table (not shown) which provides a unique dedicated data path connecting each source SoC device and destination SoC device of the system 100. Furthermore, to prevent a single busy path from stalling the system 100, each dedicated data path includes a corresponding busy path (not shown) configured for carrying busy signals from the destination device of a dedicated data path to its source SoC device. The quick router 122a of the packet router 106a may receive data packets (134) from the nonlocal SoC device 104a through an interface 136. The interface 136 may include a data link layer (DLL) and 8b/10b serializer/deserializer (SerDes) interface configured to transmit data packets at high speed between SoC devices 102, 104a-c.

The quick router 122a may determine the destination of a data packet received from the nonlocal SoC device 104a. For example, each data packet originating from a source nonlocal SoC device 104a may have a destination associated with a destination SoC device 102, 104b-c as well as a dedicated data path connecting the source and destination devices. The quick router 122a may determine whether the received data packet is an inbound data packet 116 having a destination associated with the local SoC device 102 or a bypass data packet 118 having a destination associated with another nonlocal SoC device 104b, 104c. For example, each data packet transmitted throughout the system 100 may comprise a sequence of words or fields, each word or field associated with packet data. The system 100 may associate the first word of every data packet with a destination address. Therefore any quick router 122 receiving a data packet from a nonlocal SoC device 104 (the source device of the data packet) may determine the destination of the data packet based on the destination address in the first word of the data packet, without the need to fully decode or deserialize the data packet. The routing table of the system 100 may define one, and only one, dedicated data path for each combination of a source device and a destination device. Therefore the quick router 122a of the packet router 106a may forward every inbound data packet 116 having a destination associated with the local SoC device 102 to the router bridge 126a. Similarly, the quick router 122a may forward every bypass data packet 118 intended for bypass routing to the destination nonlocal SoC devices 104b, 104c. For example, a packet router 106 associated with the nonlocal SoC device 104c may receive the bypass data packet 118 from the packet router 106a, forwarding the bypass data packet 118 to the nonlocal SoC device 104c via an arbiter 124.

In one embodiment, each packet router 106 of the system 100 includes an arbiter 124a-c configured to receive outbound data packets 114 and bypass data packets 118 having a destination associated with a nonlocal SoC device 104a-c. For example, each arbiter 124 of a packet router 106 of the system 100 may include a series of three (e.g., n–1 interfaces for a system 100 of n SoC devices 102, 104) first in/first out (FIFO) interfaces 138, each FIFO interface 138 configured to receive data packets from either the local SoC device 102 (outbound data packets 114) or a nonlocal SoC device 104a-c (bypass data packets 118) of the system 100. The arbiter 124a of the packet router 106a may transmit outbound data packets 114 and bypass data packets 118 to the interface 136 connecting the packet router 106a to the nonlocal SoC device 104a on a round-robin basis or according to a predetermined arbitration scheme. The arbiter 124a may maintain continuous throughput by cycling through each successive FIFO interface 138a-c at each clock cycle and transmitting any outbound or bypass data packets 114, 118 that may be present. The arbiter 124a may support burst transmissions of outbound and bypass data packets 114, 118 by assigning a priority to each FIFO interface 138a-c or to an SoC device 102, 104a-c at which the outbound and bypass data packets 114, 118 originate.

In one embodiment, each packet router 106a-c of the system 100 includes a router bridge 126a-c. Generally speaking, the router bridge 126a of the packet router 106a may receive inbound data packets 116 from the quick router 122a and forward outbound data packets 114 to the arbiter 124a. The router bridge 126a may receive incoming MOCB commands 110 from the MOCB crossbar 108 of an initiator device (e.g., the local SoC device 102) for transmission to a target device (the nonlocal SoC device 104a), generating outbound data packets 114 based on the received MOCB commands 110. The router bridge 126a may generate MOCB responses 112 (including return responses and invalid address responses) based on inbound data packets 116 received from the quick router 122a, forwarding the MOCB responses 112 to the MOCB crossbar 108.

Figure 2B:
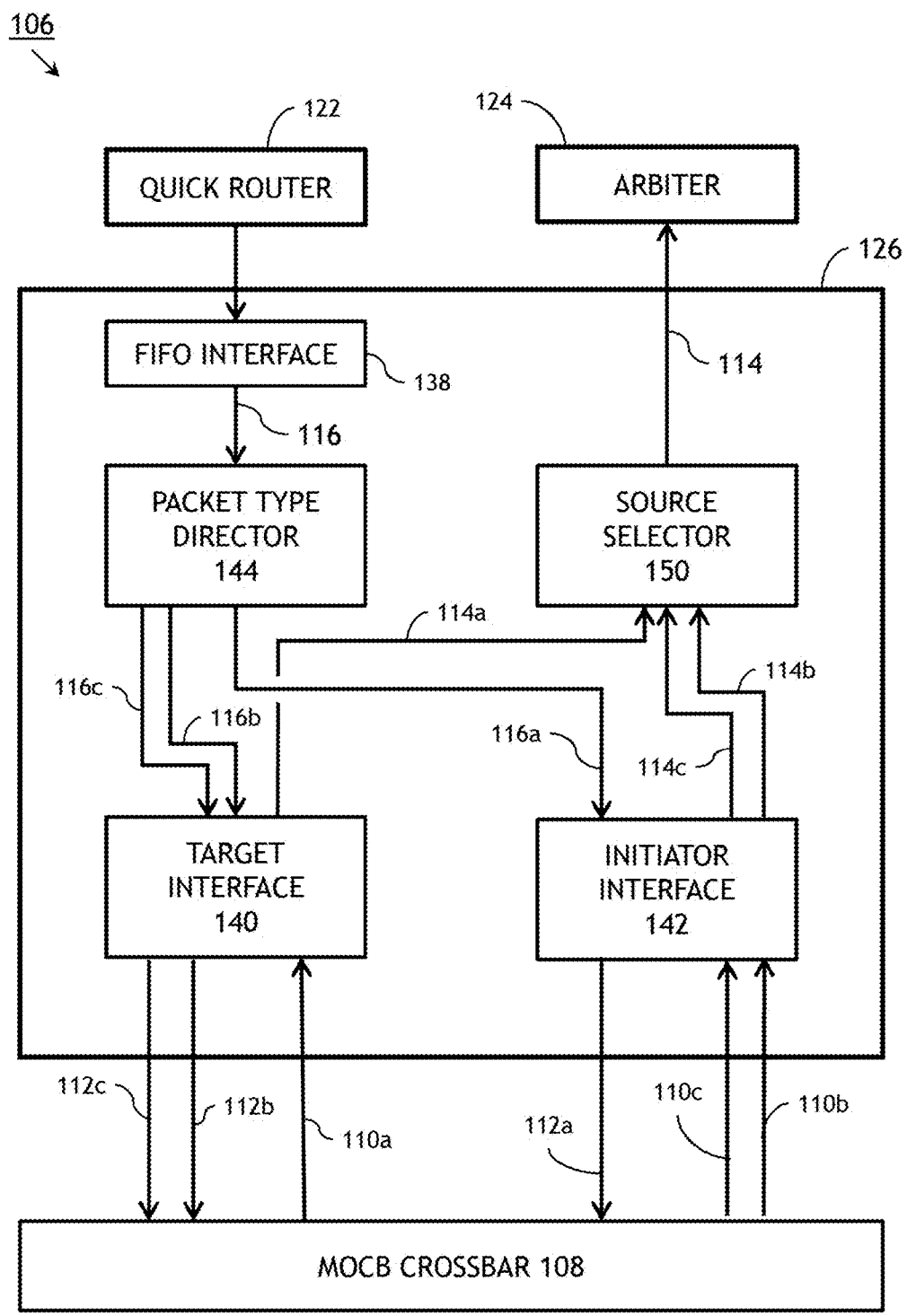
FIG. 2B is a block diagram of an embodiment of a router bridge of the system of FIG. 2A according to the inventive concepts disclosed herein.
Figure 3:
FIG. 3 is a diagrammatic illustration of data packet formats utilized by a system according to the inventive concepts disclosed herein.
Figure 3:
Figure 3:

Referring now to FIG. 2B, a router bridge 126 of a packet router 106 may include a target interface 140 and an initiator interface 142 for handling data packets, commands, and responses depending upon the precise configuration and implementation of the system 100. The router bridge 126 may include a packet type director 144 configured for directing inbound data packets 116 to the appropriate interface. For example, the packet type director 144 may determine whether an inbound data packet 116 is a command data packet 116a, a return response data packet 116b, or an invalid address response data packet 116c. Referring also to FIG. 3, examples of packet format for inbound data packets 116a-c utilized by an embodiment of the system 100 are shown. The same packet formats may apply to outbound data packets 114 generated by the router bridge 126. Regardless of format, each inbound data packet 116a-c may include a destination field 146 corresponding to the first word of the data packet. The inbound data packet 116 may be forwarded to the router bridge 126 by the quick router 122 based on this destination field 146 and a source field 148 (indicating the nonlocal SoC device 104 at which the inbound data packet 116 originated). A command data packet 116a may further include header and data fields corresponding to the number of words to read or write from a given address. A return response data packet 116b may further include data fields corresponding to a requested data read, while an invalid address response data packet 116c may include no data fields, returning to the master initiating a read command (here, the local SoC device 102) that the command attempted to read from an invalid address.

Referring back to FIG. 2B, the packet type director 144 may forward command data packets 116a to the initiator interface 142 while forwarding return response data packets 116b and invalid address response data packets 116c to the target interface 140. The target interface 140 and initiator interface 142 may each be configured to concurrently and separately manage inbound data packets 116 forwarded by the packet type director 144 and outbound MOCB commands 110 received from the local SoC device (via the MOCB crossbar 108). For example, in an implementation of the system 100 where the local SoC device 102 serves as an initiator (e.g., master) device, the target interface 140 may generate MOCB return responses 112b and MOCB invalid address responses 112c by deserializing return response data packets 116b and invalid address response data packets 116c. The target interface 140 may forward the generated MOCB return responses 112b and MOCB invalid address responses 112c to the MOCB crossbar 108 of the local SoC device. The target interface 140 may receive read/write commands 110a from the local SoC device 102 (the initiator/master device) for forwarding to the nonlocal SoC device 104a (the target/slave device). The target interface may generate an outbound data packet 114a (having a format similar to the inbound command data packet 116a, as shown by FIG. 3) by serializing the read/write command 110a, forwarding the resulting outbound data packet 114a to a source selector 150 of the router bridge 126.

Similarly, the initiator interface 142 may generate MOCB read/write commands 112a (e.g., commands from a nonlocal SoC device 104 serving as an initiator/master to a local SoC device 102 serving as a target/slave) by deserializing received command data packets 116a, forwarding the generated read/write commands 112a to the MOCB crossbar 108. The initiator interface 142 may receive MOCB responses (including MOCB return responses 110b and MOCB invalid address responses 110c) from the MOCB crossbar 108 of the local SoC device 102 and generate outbound data packets 114b, 114c by serializing the MOCB return responses 110b and MOCB invalid address responses 110c, forwarding the resulting outbound data packets 114b, 114c to the source selector 150. The source selector 150 of the router bridge 126 may forward all generated outbound data packets 114 to the arbiter 124 for transmission to the destination nonlocal SoC device 104a.

Figure 4A:
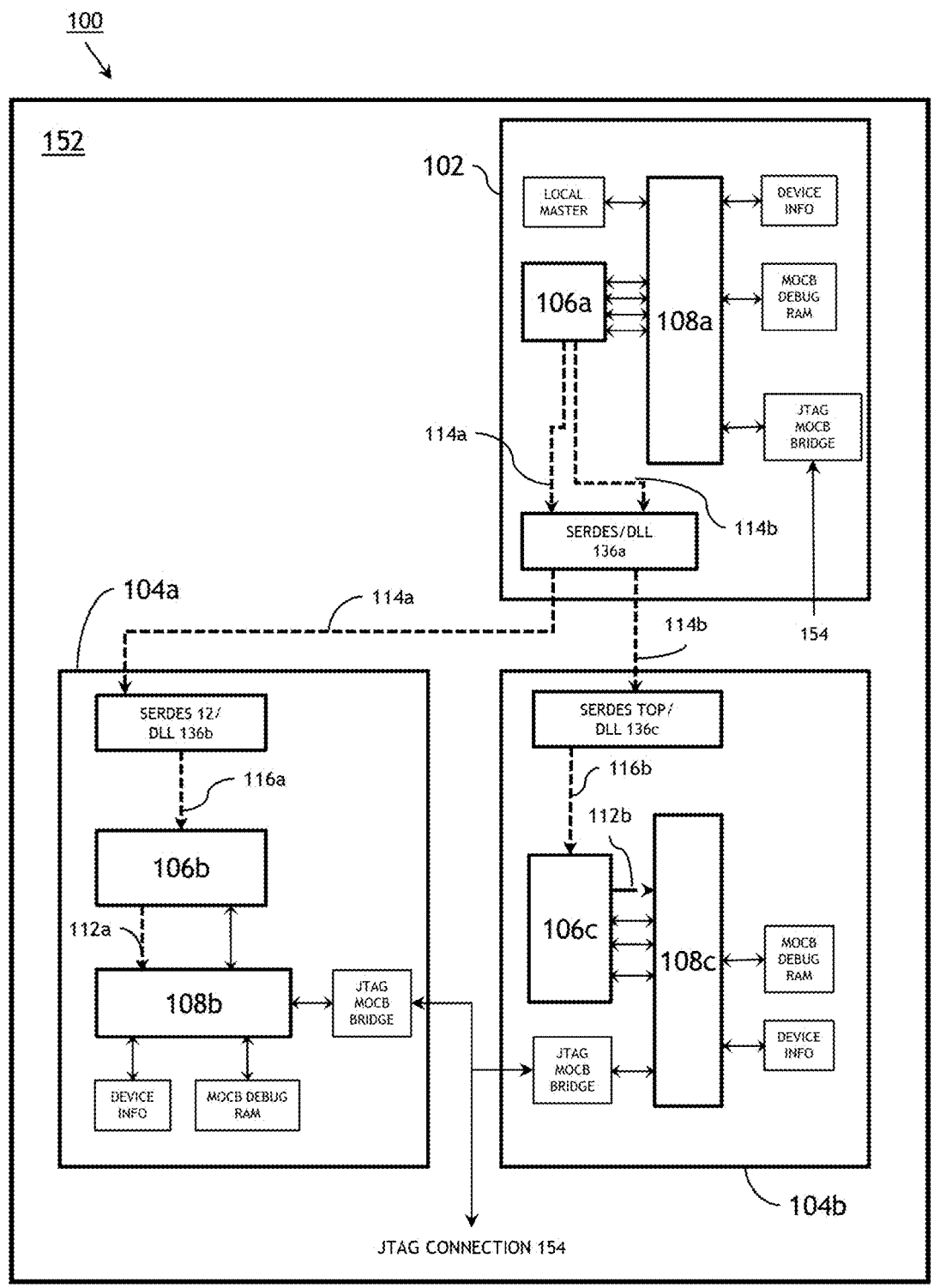
FIGS. 4A and 4B are block diagrams of embodiments of a system according to the inventive concepts disclosed herein.
Figure 4B:
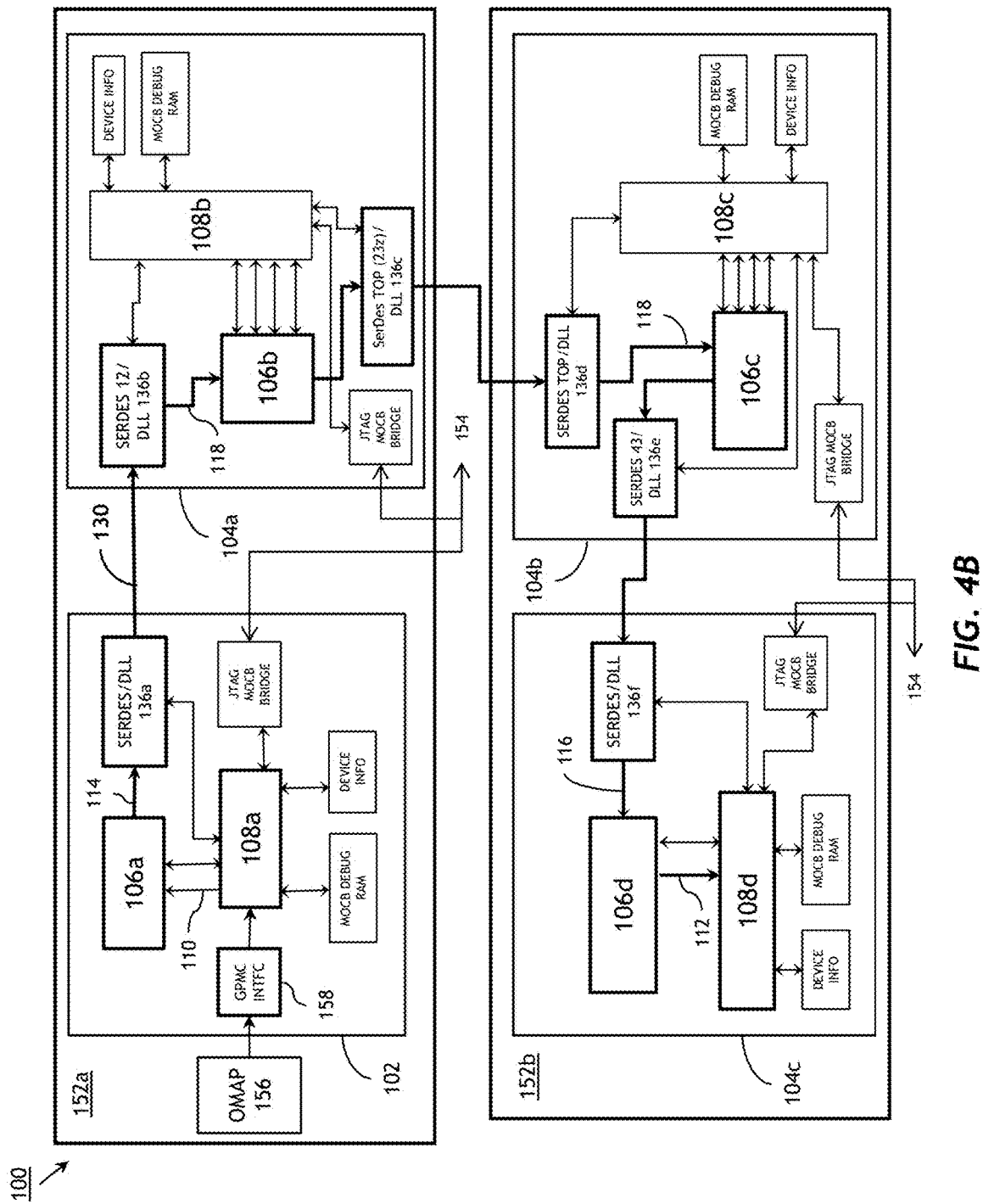

Referring to FIGS. 4A and 4B, implementations of a system 100 are shown. Referring specifically to FIG. 4A, the system 100 may be implemented in a network of three field programmable gate arrays (FPGAs) or application specific integrated circuits (ASIC) in a single chip or physical device 152, the FPGAs/ASICs corresponding to local SoC device 102 (e.g., initator device) and nonlocal SoC devices 104a, 104b (e.g., target devices). The local SoC device 102 and nonlocal SoC devices 104a, 104b may include Joint Test Action Group (JTAG) connections 154 to test access ports (not shown). While the implementation of the system 100 as shown by FIG. 4A illustrates a basic tree topology (with the local SoC device 102 serving as the root), the system 100 may be adapted to any desired network topology, e.g., line or bus, tree, ring, mesh, or star topologies. The interconnectivity between devices, arrangement of packet routers 106, and the corresponding routing table (not shown) for a particular implementation of the system 100, may be determined by the desired network topology. For example, data communications (e.g., MOCB commands/responses 110) originating from the local SoC device 102 and destined for the nonlocal SoC device 104a may pass through the MOCB crossbar 108a to the packet router 106a. The resulting outbound data packets 114a generated by the packet router 106a may include a first word corresponding to a destination (not shown) associated with the destination device, i.e., nonlocal SoC device 104a. The packet router 106a may forward the outbound data packets 114a through the interfaces 136a, 136b and to the packet router 106b associated with the nonlocal SoC device 104a. The packet router 106b may deserialize the inbound data packets 116a into MOCB commands/responses 112a, forwarding the resulting MOCB commands/responses 112a to the crossbar 108b of the nonlocal SoC device 104a. Similarly, data communications destined for the nonlocal SoC device 104b may be packetized by the packet router 106a, the resulting outbound data packets 114b routed through the interfaces 136a, 136c to the packet router 106c associated with the nonlocal SoC device 104b, which may deserialize the inbound data packets 116b into MOCB commands/responses 112b and forward the MOCB commands/responses to the MOCB crossbar 108c.

Referring now to FIG. 4B, the system 100 may be implemented in a group of several FPGAs/ASICs (local SoC device 102 and nonlocal SoC devices 104a, 104b, 104c) networked in a line or bus topology across two [modems, chips, physical devices] 152a, 152b. Based on this topology, any two member devices of the system 100 may have two unique data paths (where the first device is a source and the second device the destination, and where the second device is the source and the first device the destination) indicated by the routing table (not shown) of the system 100 and linked to each packet router 106a, 106b, 106c, 106d. For example, an MOCB command (e.g., a read/write command) 110 destined for the nonlocal SoC device 104c on modem 152b may originate with an open media applications platform (OMAP) processor 156 of the system 100, passing through a group policy management console (GPMC) interface to the MOCB crossbar 108a. The packet router 106a may serialize the MOCB command 110 into outgoing data packets 114, the outgoing data packets 114 having a destination (not shown) associated with the nonlocal SoC device 104c and a corresponding data path 130 (bolded) to the nonlocal SoC device 104c. The outbound data packets 114 may be forwarded by the packet router 106a through interfaces 136a, 136b to the packet router 106b. The packet router 106b (and the packet router 106c associated with the nonlocal SoC device 104b) may treat the inbound data packets as bypass data packets 118 based on their destination field (e.g., the first word of each bypass data packet 118), which may forward the bypass data packets 118 to the packet router 106d associated with the nonlocal SoC device 104c, the destination device of the bypass data packets 118. The packet router 106d may determine that the bypass data packets 118 are destined for the nonlocal SoC device 104c and deserialize the inbound data packets 116 into MOCB commands 112, forwarding the resulting MOCB commands 112 to the MOCB crossbar 108d.

Figure 5:
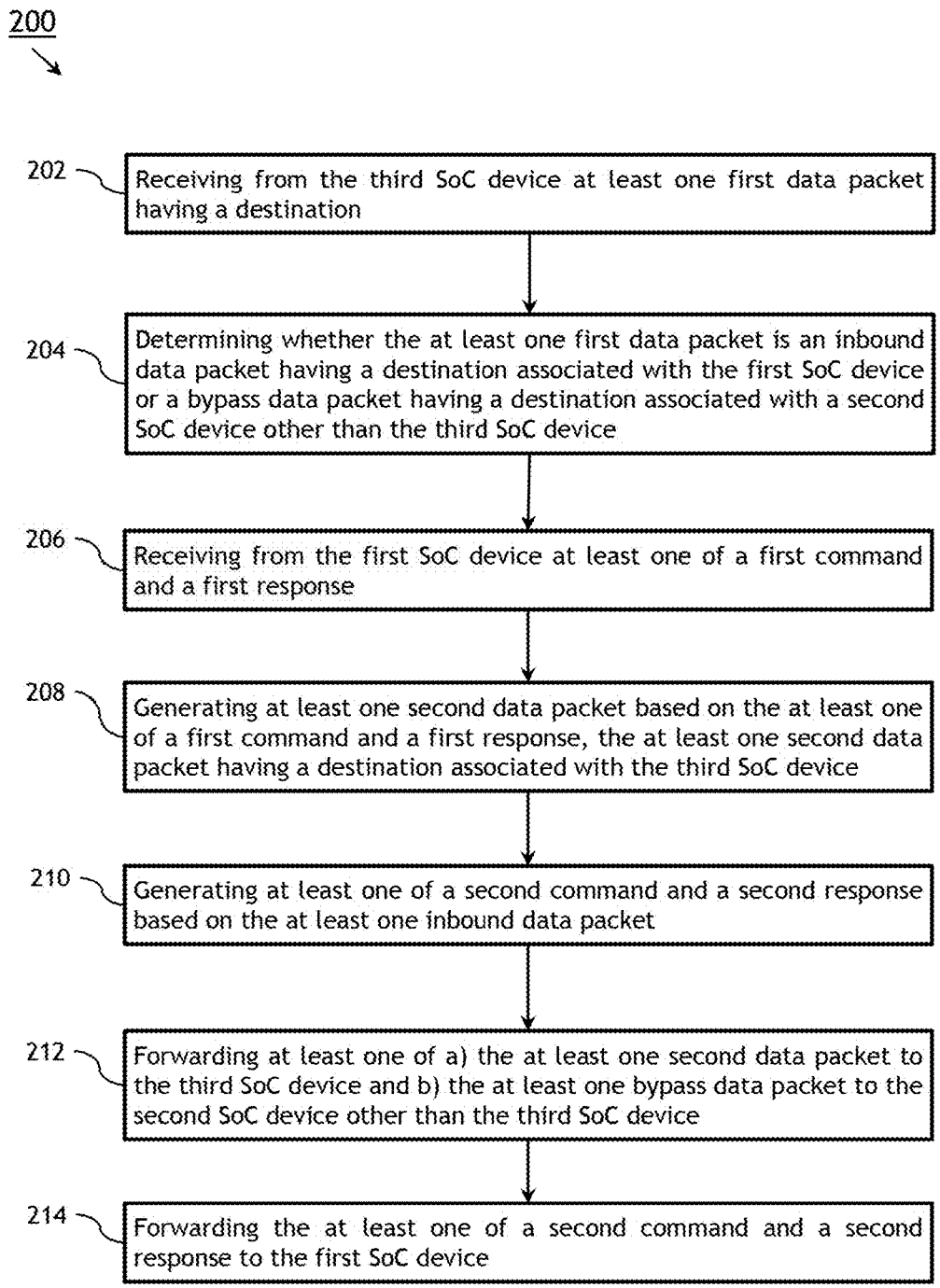
FIG. 5 is a process flow diagram illustrating a method according to the inventive concepts disclosed herein.

Referring to FIG. 5, a flow diagram of a method 200 for routing data communications between a local system on a chip (SoC) device 102 and at least one nonlocal SoC device 104 including a third SoC device 104a exemplary of one embodiment of the inventive concepts disclosed herein is shown. The method 200 for routing data communications between the local SoC device 102 and at least one nonlocal SoC device 104 including a nonlocal SoC device 104a may include, at a step 202, receiving from the nonlocal SoC device 104a at least one data packet having a destination 146. The method 200 may include, at a step 204, determining whether the data packet is an inbound data packet 116 having a destination 146 associated with the local SoC device 102 or a bypass data packet 118 having a destination associated with a nonlocal SoC device 104b, 104c other than the nonlocal SoC device 104a. For example, the quick router 122 of a packet router 106 may determine whether the data packet is an inbound data packet 116 or a bypass data packet 118 based on the first word of the data packet, where the first word corresponds to the destination 146 of the data packet. Furthermore, the packet type director 144 of the router bridge 126 may determine whether an inbound data packet 116 is a command data packet 116a or a response data packet (including a return response data packet 116b and an invalid address response data packet 116c), forwarding the command data packet 116a to the initiator interface 142 and the response data packet 116b, 116c to the target interface 140.

The method 200 may include, at a step 206, receiving from the local SoC device 102 at least one of a received MOCB command 110a and a received MOCB response 110b, 110c. The method 200 may include, at a step 208, generating an outbound data packet 114 based on the received command 110a or the first response 110b, 110c, the outbound data packet 114 having a destination 146 associated with the nonlocal SoC device 104a. The method 200 may include, at a step 210, generating at least one of a generated MOCB command 112a and a generated MOCB response 112b, 112c based on the inbound data packet 116. For example, the target interface 140 of the router bridge 126 may generate either an MOCB return response 112b or an MOCB invalid address response 112c, depending on whether the inbound data packet 116 is a return response data packet 116b or an invalid address response data packet 116c. Furthermore, the initiator interface 142 may generate an MOCB command 112a based on a received command data packet 116a.

The method 200 may include, at a step 212, forwarding at least one of the outbound data packet 114 (to the nonlocal SoC device 104a) and the bypass data packet 118 (to the nonlocal SoC device 104b, 104c). For example, the arbiter 124 of the packet router 106 may forward either the outbound data packet 114 or the bypass data packet 118 based on a predetermined arbitration scheme or based on a priority assigned to one or more of the data packets or to their originating SoC devices. The method 200 may include, at a step 214, forwarding the generated MOCB command 112a or the generated MOCB response 112b, 112c to the local SoC device 102. For example, the initiator interface 142 may forward the generated MOCB command 112a to the local SoC device 102, and the target interface 140 may forward the generated MOCB return response 112b or the generated MOCB invalid address response 112c to the local SoC device 102 (via the crossbar 108).

CONCLUSION

Specific blocks, sections, devices, functions, processes, and modules may have been set forth. However, a skilled technologist will realize that there are many ways to partition the system, and that there are many parts, components, processes, modules or functions that may be substituted for those listed above.

Those having skill in the art will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the broad scope of the inventive concepts described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

We claim:

1. A full-duplex Modem Hardware Abstraction Layer (MHAL) routing system, comprising:
   a first system-on-chip (SoC) device;
   at least one second SoC device;
   a third SoC device; and
   at least one packet router communicatively coupled to the first SoC device and to the at least one second SoC device via a MHAL On-Chip Bus (MOCB) crossbar, wherein the at least one packet router includes:
   a router bridge communicatively coupling the at least one packet router to the first SoC device via the MOCB crossbar, the router bridge including:
      a type director communicatively coupled to a quick router of the at least one packet router, the type director configured to a) receive the at least one inbound data packet from the quick router; b) determine whether the at least one inbound data packet is at least one first command data packet or at least one first response data packet; c) forward the at least one first response data packet to a first interface of the router bridge; and d) forward the at least one first command data packet to a second interface of the router bridge;
      the first interface configured to a) generate at least one second response based on the at least one first response data packet, the at least one second response including at least one of a first return response and a first invalid address response; b) forward the at least one of the first return response and the first invalid address response to the first SoC device; c) receive the first command from the first SoC device; d) generate the at least one second data packet based on the first command; and e) forward the at least one second data packet to a source selector of the router bridge;
      the second interface configured to a) receive the first response from the first SoC device, the first response including at least one of a second return response and a second invalid address response; b) generate the at least one second data packet based on the first response; c) forward the at least one second data packet to the source selector; d) generate at least one second command based on the at least one first command data packet; and e) forward the at least one second command to the first SoC device; and the source selector configured to forward the at least one second data packet to an arbiter of the at least one packet router;

the arbiter communicatively coupling the at least one packet router to the at least one second SoC device and configured to:

receive the at least one second data packet from the router bridge;

receive at least one third data packet from the at least one SoC device other than the third SoC device, the at least one third data packet having a destination associated with the third SoC device; and forward at least one of the at least one second data packet and the at least one third data packet to the third SoC device; and the quick router communicatively coupled to the third SoC device and configured to:

receive the at least one first data packet from the third SoC device;

determine whether the at least one first data packet is the at least one inbound data packet having a destination associated with the first SoC device or the at least one bypass data packet having a destination associated with the at least one SoC device other than the third SoC device;

forward the at least one inbound data packet to the router bridge; and forward the at least one bypass data packet to the at least one SoC device other than the third SoC device, the at least one packet router configured to:

receive from the third SoC device at least one first data packet having a destination;

determine whether the at least one first data packet is at least one inbound data packet having a destination associated with the first SoC device or at least one bypass data packet having a destination associated with at least one SoC device other than the third SoC device based on an initial word of the at least one first data packet;

receive from the first SoC device, via the MOCB crossbar, at least one of a first command and a first response;

generate at least one second data packet based on the at least one of a first command and a first response, the at least one second data packet having a destination associated with the third SoC device;

generate at least one of a second command and a second response based on the at least one inbound data packet;

forward, via the MOCB crossbar, at least one of a) the at least one second data packet to the third SoC device and b) the at least one bypass data packet to the at least one SoC device other than the third SoC device; and forward, via the MOCB crossbar, the at least one of a second command and a second response to the first SoC device.

2. The system of claim 1, wherein:

the at least one first data packet includes an ordered sequence of words;

the first word of the ordered sequence of words corresponds to the destination of the at least one first data packet; and the quick router is configured to determine whether the at least one first data packet is the at least one inbound data packet or the at least one bypass data packet based on the first word.

3. The system of claim 1, wherein:

at least one of the second return response and the second invalid address response includes a response received from a MOCB protocol target device;

the first command includes at least one of a first read command associated with the MOCB protocol target device and a first write command associated with the MOCB protocol target device;

at least one of the first return response and the first invalid address response is associated with an MOCB protocol initiator device; and the at least one second command includes at least one of a second read command received from the MOCB protocol initiator device and a second write command received from the MOCB protocol initiator device.

4. The system of claim 1, wherein:

the arbiter includes a first first-in/first-out (FIFO) interface configured to receive the at least one second data packet from the router bridge and at least one second FIFO interface configured to receive the at least one third data packet from the at least one SoC device other than the third SoC device; and the arbiter is configured to forward the at least one of the at least one second data packet and the at least one third data packet based on at least one of an arbitration scheme and at least one assigned priority.

5. The system of claim 1, wherein the first SoC device and the at least one second SoC device are arranged in at least one of a star topology, a tree topology, a line topology, a mesh topology, and a ring topology.

6. The system of claim 1, wherein the first SoC device and the at least one second SoC device include at least one of a field programmable gate array (FPGA) and an application specific integrated circuit (ASIC).

7. The system of claim 1, wherein the first SoC device and the at least one second SoC device are embodied in a single physical device.

8. The system of claim 1, wherein the first SoC device and the at least one second SoC device are embodied in two or more physical devices.

9. A system, comprising:

a first system-on-chip (SoC) device;

at least one second SoC device;

a third SoC device;

first circuitry, comprising:

circuitry for receiving from the third SoC device at least one first data packet having a destination;

circuitry for determining whether the at least one first data packet is at least one inbound data packet having a destination associated with the first SoC device or at least one bypass data packet having a destination associated with at least one SoC device other than the third SoC device based on an initial word of the at least one first data packet;

circuitry for receiving from the first SoC device at least one of a first command and a first response;

circuitry for generating at least one second data packet based on the at least one of a first command and a first response, the at least one second data packet having a destination associated with the third SoC device;

circuitry for generating at least one of a second command and a second response based on the at least one inbound data packet;

circuitry for forwarding at least one of a) the at least one second data packet to the third SoC device and b) the at least one bypass data packet to the at least one SoC device other than the third SoC device; and circuitry for forwarding the at least one of a second command and a second response to the first SoC device; and second circuitry, comprising:

circuitry for communicatively coupling the first circuitry to the first SoC device, the circuitry for communicatively coupling the first circuitry to the first SoC device including:

a type director communicatively coupled to a quick router of the first circuitry, the type director configured to a) receive the at least one inbound data packet from the quick router; b) determine whether the at least one inbound data packet is at least one first command data packet or at least one first response data packet; c) forward the at least one first response data packet to a first interface of the second circuitry; and d) forward the at least one first command data packet to a second interface of the second circuitry.

10. The system of claim 9, wherein the circuitry for determining whether the at least one first data packet is at least one inbound data packet having a destination associated with the first SoC device or at least one bypass data packet having a destination associated with at least one SoC device other than the third SoC device includes:

circuitry for determining, based on a first word of the at least one first data packet, whether the at least one first data packet is a) the at least one inbound data packet having a destination associated with the first SoC device or b) the at least one bypass data packet having a destination associated with at least one SoC device other than the third SoC device, wherein the initial word is the first word corresponding to the destination of the at least one first data packet and comprises a data packet word used by the quick router to determine the destination of the at least one first data packet.

11. The system of claim 9, wherein the circuitry for determining whether the at least one first data packet is at least one inbound data packet having a destination associated with the first SoC device or at least one bypass data packet having a destination associated with at least one SoC device other than the third SoC device includes:

circuitry for determining if the at least one inbound data packet is at least one first command data packet or at least one first response data packet;

circuitry for generating at least one of a first return response and a first invalid address response based on the at least one first response data packet;

circuitry for generating at least one second command based on the at least one first command data packet;

circuitry for forwarding the at least one of a first return response and a first invalid address response to the first SoC device.

12. The system of claim 9, wherein the circuitry for forwarding at least one of a) the at least one second data packet to the third SoC device and b) the at least one bypass data packet to the at least one SoC device other than the third SoC device includes:

circuitry for forwarding at least one of a) the at least one second data packet to the third SoC device and b) the at least one bypass data packet to the at least one SoC device other than the third SoC device based on at least one of an arbitration scheme and an assigned priority.

13. The system of claim 9, wherein the first SoC device and the at least one second SoC device are arranged in at least one of a star topology, a tree topology, a line topology, a mesh topology, and a ring topology.

14. The system of claim 9, wherein the first SoC device and the at least one second SoC device are embodied in a single physical device.

15. The system of claim 9, wherein the first SoC device and the at least one second SoC device are embodied in two or more physical devices.

16. A method for full-duplex Modem Hardware Abstraction Layer (MHAL) routing between a first system-on-a-chip (SoC) device and at least one second SoC device including a third SoC device, the method comprising:

receiving from the third SoC device at least one first data packet having a destination, the receiving via a MHAL On-Chip Bus (MOCB) crossbar;

determining whether the at least one first data packet is at least one inbound data packet having a destination associated with the first SoC device or at least one bypass data packet having a destination associated with at least one SoC device other than the third SoC device based on an initial word of the at least one first data packet, wherein determining whether the at least one first data packet is at least one inbound data packet having a destination associated with the first SoC device or at least one bypass data packet having a destination associated with at least one SoC device other than the third SoC device includes determining if the at least one inbound data packet is at least one command data packet or at least one response data packet;

generating at least one of a second command and a second response based on the at least one inbound data packet includes generating at least one of a first return response and a first invalid address response based on the at least one response data packet;

generating at least one of a second command and a second response based on the at least one inbound data packet includes generating at least one second command based on the at least one command data packet; and forwarding the at least one of a second command and a second response to the first SoC device includes forwarding, via the MOCB crossbar, the at least one of a first return response and a first invalid address response to the first SoC device;

receiving from the first SoC device, via the MOCB crossbar, at least one of a first command and a first response;

generating at least one second data packet based on the at least one of a first command and a first response, the at least one second data packet having a destination associated with the third SoC device;

generating at least one of a second command and a second response based on the at least one inbound data packet;

forwarding, via the MOCB crossbar, at least one of a) the at least one second data packet to the third SoC device and b) the at least one bypass data packet to the at least one SoC device other than the third SoC device; and forwarding, via the MOCB crossbar, the at least one of a second command and a second response to the first SoC device.

17. The method of claim 16, wherein determining whether the at least one first data packet is at least one inbound data packet having a destination associated with the first SoC device or at least one bypass data packet having a destination associated with at least one SoC device other than the third SoC device includes:

determining, based on a first word of the at least one first data packet, whether the at least one first data packet is the at least one inbound data packet having a destination associated with the first SoC device or the at least one bypass data packet having a destination associated with the at least one SoC device other than the third SoC device, the first word corresponding to the destination of the first data packet.

18. The method of claim 16, wherein forwarding, via the MOCB crossbar, at least one of a) the at least one second data packet to the third SoC device and b) the at least one bypass data packet to the at least one SoC device other than the third SoC device includes:

forwarding, via the MOCB crossbar, at least one of a) the at least one second data packet to the third SoC device and b) the at least one bypass data packet to the at least one SoC device other than the third SoC device based on at least one of an arbitration scheme and an assigned priority.

\* \* \* \* \*